(12) United States Patent
Longley et al.

(10) Patent No.: US 12,027,870 B2
(45) Date of Patent: Jul. 2, 2024

(54) POWER-DATA NODES FOR AN AIRCRAFT SYSTEM

(71) Applicant: Lockheed Martin Corporation, Bethesda, MD (US)

(72) Inventors: Robert F. Longley, Oxford, CT (US); John Chellgren, Norwalk, CT (US); Christopher Patrick Sullivan, Monroe, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 25 days.

(21) Appl. No.: 17/668,763

(22) Filed: Feb. 10, 2022

(65) Prior Publication Data

US 2023/0253801 A1 Aug. 10, 2023

(51) Int. Cl.
*H02J 4/00* (2006.01)
*B64D 27/24* (2024.01)
*H02J 7/00* (2006.01)

(52) U.S. Cl.
CPC ............... *H02J 4/00* (2013.01); *B64D 27/24* (2013.01); *H02J 7/0068* (2013.01); *B64D 2221/00* (2013.01); *H02J 2310/44* (2020.01)

(58) Field of Classification Search
CPC ........ H02J 4/00; H02J 7/0068; H02J 2310/44; H02J 1/086; H02J 13/00036; H02J 1/084; B64D 27/24; B64D 2221/00
See application file for complete search history.

(56) References Cited

U.S. PATENT DOCUMENTS

| 4,943,919 A | * | 7/1990 | Aslin | G07C 5/006 |
| | | | | 701/32.7 |
| 5,802,077 A | * | 9/1998 | Yeh | G06F 11/187 |
| | | | | 370/242 |
| 8,421,692 B2 | | 4/2013 | Stoneback et al. | |

(Continued)

FOREIGN PATENT DOCUMENTS

| WO | 2011081943 A2 | 7/2011 |
| WO | 2014200854 A1 | 12/2014 |

OTHER PUBLICATIONS

Extended European Search Report for Application No. 23154401.6 dated Jun. 28, 2023 (11 pages).

*Primary Examiner* — Rexford N Barnie
*Assistant Examiner* — Terrence R Willoughby
(74) *Attorney, Agent, or Firm* — Michael Best & Friedrich LLP

(57) ABSTRACT

Systems and methods for power and data distribution on an aircraft. One embodiment provides an aircraft comprising a plurality of nodes, a power system controller, and an aircraft controller. Each node is connected to a plurality of LRUs, and each node includes a node controller. The power system controller is configured to control power distribution to each node. The aircraft controller is configured to transmit data to each node and to receive data from each node. The node controller includes an electronic processor and a memory. The node controller is configured to control power to the plurality of LRUs, receive first data from at least one LRU of the plurality of LRUs, and provide the first data to the aircraft controller. The node controller is further configured to receive second data from the aircraft controller and provide the second data to at least one LRU of the plurality of LRUs.

20 Claims, 11 Drawing Sheets

(56) References Cited

U.S. PATENT DOCUMENTS

| | | |
|---|---|---|
| 8,797,842 B2 | 8/2014 | Dame |
| 9,914,548 B1 | 3/2018 | Vadillo |
| 10,065,583 B2 | 9/2018 | Carleial et al. |
| 2001/0028241 A1 | 10/2001 | Saito et al. |
| 2004/0054821 A1 | 3/2004 | Warren et al. |
| 2008/0205416 A1* | 8/2008 | DeChiara .......... H04L 12/40013 370/465 |
| 2016/0196457 A1* | 7/2016 | Mylaraswamy ........ H04W 4/80 340/10.1 |
| 2017/0063151 A1* | 3/2017 | Freitag .............. H02J 13/00007 |
| 2020/0251970 A1* | 8/2020 | Zatorski ................. H02K 5/203 |
| 2020/0266855 A1* | 8/2020 | Liu ......................... H04L 12/40 |
| 2021/0352384 A1* | 11/2021 | Jester .................. H04W 12/121 |

\* cited by examiner

POWER-DATA NODES FOR AN AIRCRAFT SYSTEM

GOVERNMENT SUPPORT

This invention was made with government support under W911W6-19-9-0005 awarded by the United States Army. The government has certain rights in the invention.

FIELD OF INVENTION

Embodiments described herein relate to power and data distribution and, in particular, to systems and methods for power and data distribution on an aircraft.

BACKGROUND

Modern aircrafts include a large amount of circuitry and electronic components, such as line replacement units (LRUs). The electronic components are located in all sections of the aircraft, resulting in a large amount of wiring and a complex electrical power bus structure. Additionally, both data and power requirements of LRUs are commonly handled independently by a centralized controller. This arrangement complicates the process of replacing LRUs and other electronic devices within the aircraft, as wiring may need to be replaced that connects the LRUs and other electronic devices with the centralized controller or power bus.

SUMMARY

One embodiment provides an aircraft comprising a plurality of nodes, a power system controller, and an aircraft controller. Each node of the plurality of nodes is connected to a plurality of line replacement units (LRUs), and each node includes a node controller. The power system controller is configured to control power distribution to each of the plurality of nodes. the aircraft controller is configured to transmit data to each of the plurality of nodes and to receive data from each of the plurality of nodes. The node controller includes an electronic processor and a memory. The node controller is configured to control power to the plurality of LRUs, receive first data from at least one LRU of the plurality of LRUs, and provide the first data to the aircraft controller. The node controller is further configured to receive second data from the aircraft controller and provide the second data to at least one LRU of the plurality of LRUs.

Another embodiment provides a method of updating an aircraft system. The method includes monitoring, with an edge power distribution node (EPDN), a first line replacement unit (LRU), and transferring, with the EPDN, first data received from the first LRU to a vehicle computer. The method includes detecting, at the EPDN, a connection of a second LRU to the EPDN, and transmitting, with the EPDN, a status update to the vehicle computer. The method includes transferring, with the EPDN, second data received from the second LRU to the vehicle computer.

Another embodiment provides a control system for an aircraft. The control system includes a node connected to a first line replacement unit (LRU) and an aircraft controller configured to transmit data to the node and configured to receive data from the node. The node includes a node controller including an electronic processor and a memory. The node controller is configured to control, with a switching network, power to the first LRU, provide commands from the aircraft controller to the first LRU, and provide data from the first LRU to the aircraft controller. The node controller is further configured to detect a connection of a second LRU and provide, upon detection of the connection of the second LRU, a status update to the aircraft controller.

Other aspects will become apparent by consideration of the detailed description and accompanying drawings.

DETAILED DESCRIPTION

Figure 1:
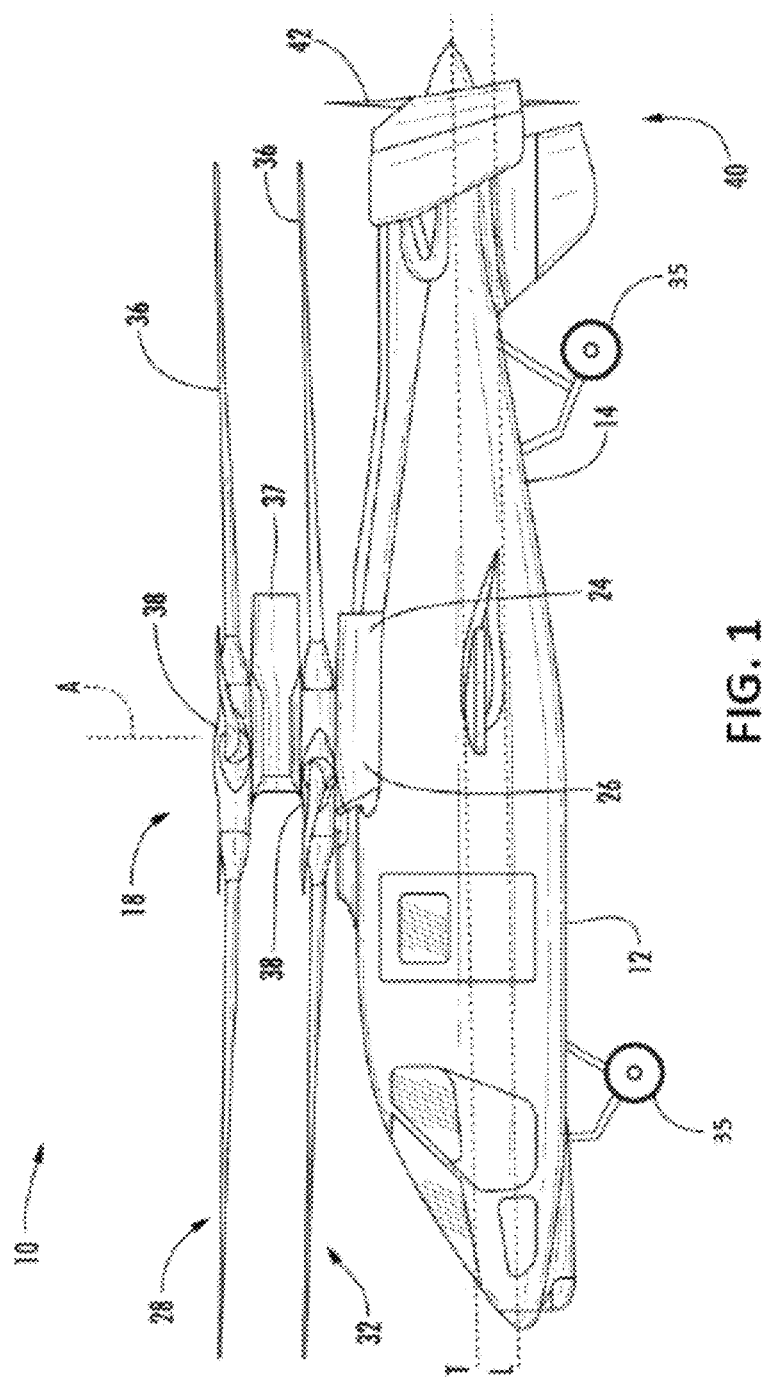
FIG. 1 depicts a rotary wing aircraft according to an exemplary embodiment.

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

It should be noted that a plurality of hardware and software-based devices, as well as a plurality of different structural components may be utilized to implement the embodiments described herein or portions thereof. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects described herein may be implemented in software (stored on non-transitory computer-readable medium) executable by one or more processors. As such, it should be noted that a plurality of hardware and software-based devices, as well as a plurality of different structural components may be used to implement the embodiments described herein. For example, "controller," "control unit," and "control assembly" described in the specification may include one or more processors, one or more memory modules including non-transitory computer-readable medium, one or more input/output interfaces, and various connections (for example, a system bus) connecting the components.

Embodiments described herein provide nodal points, such as edge power data node (EPDN) units, which act as an interchange point for handling both data and power requirements for connected LRUs. The EPDN units may be located in several sections of the aircraft. For power distribution requirements, the EPDN may provide the function of an electronic switching circuit or an electronic circuit breaker unit that delivers power to individual LRUs. For data distribution requirements, the EPDN may distribute received data signals among connected LRUs, collect data from the LRUs, and transmit collected data to other processing units located within the aircraft. Accordingly, the EPDNs combine power and data functions into a single device, supporting modular architecture and interfaces. Additionally, use of the EPDNs simplifies the electrical architecture of the aircraft, as LRUs are easily added or replaced, and wire run length between LRUs and a centralized processing unit is reduced.

Referring now to the figures, FIG. 1 depicts an embodiment of a rotary wing aircraft 10. The aircraft 10 includes an airframe 12 with an extending tail 14. A dual, counter rotating, coaxial main rotor assembly 18 is located at the airframe 12 and rotates about a main rotor axis, A. The main rotor assembly 18 is driven by a power source, for example, one or more engines 24 via a gearbox 26. In some embodiments, the aircraft 10 further includes a translational thrust system 40 located at the extending tail 14 to provide translational thrust (forward or rearward) for aircraft 10. Translational thrust system 40 includes a propeller 42 and is positioned at a tail section of the aircraft 10. Additionally, the aircraft 10 may include landing gear assemblies 35 extending from below the airframe 12. The illustrated aircraft 10 includes two front landing gear assemblies 35 (right landing gear not shown in FIG. 1) and a rear landing gear assembly 35. In some embodiments, the landing gear assemblies 35 may be retractable. The landing gear assemblies 35 include wheels and struts, which may support the aircraft 10 when landed and enable the aircraft 10 to travel when on the ground.

The main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Each of the upper rotor assembly 28 and the lower rotor assembly 32 includes a plurality of rotor blades 36 secured to a rotor hub 38. Any number of blades 36 may be used with the rotor assembly 18. The rotor assembly 18 includes a rotor hub fairing 37 generally located between and around the upper and lower rotor assemblies such that the rotor hubs 38 are at least partially contained therein. The rotor hub fairing 37 provides drag reduction.

Referring back to FIG. 1, the translational thrust system 40 includes a propeller 42 with blades. In exemplary embodiments, the pitch of propeller blades may be altered to change the direction of thrust (e.g., forward or rearward). The tail section includes active elevators and active rudders as controllable surfaces. The propeller 42 is connected to and driven by the engine(s) 24 via the gearbox 26. The translational thrust system 40 may be mounted to the rear of the airframe 12 with a translational thrust axis, T, oriented substantially horizontal and parallel to the aircraft longitudinal axis, L, to provide thrust for high-speed flight. The translational thrust axis, T, corresponds to the axis of rotation of the propeller 42. While shown in the context of a pusher-prop configuration, it is understood that the propeller 42 could also be a more conventional puller prop or could be variably facing so as to provide yaw control in addition to or instead of translational thrust.

While FIG. 1 provides an example of a rotary wing aircraft, systems described herein may also be utilized in different types of aircrafts. For example, systems described herein may be utilized in a turboprop aircraft, a piston aircraft, a jet, a fixed wing aircraft, a transport aircraft, or some other suitable aircraft or air vehicle.

Figure 2A:
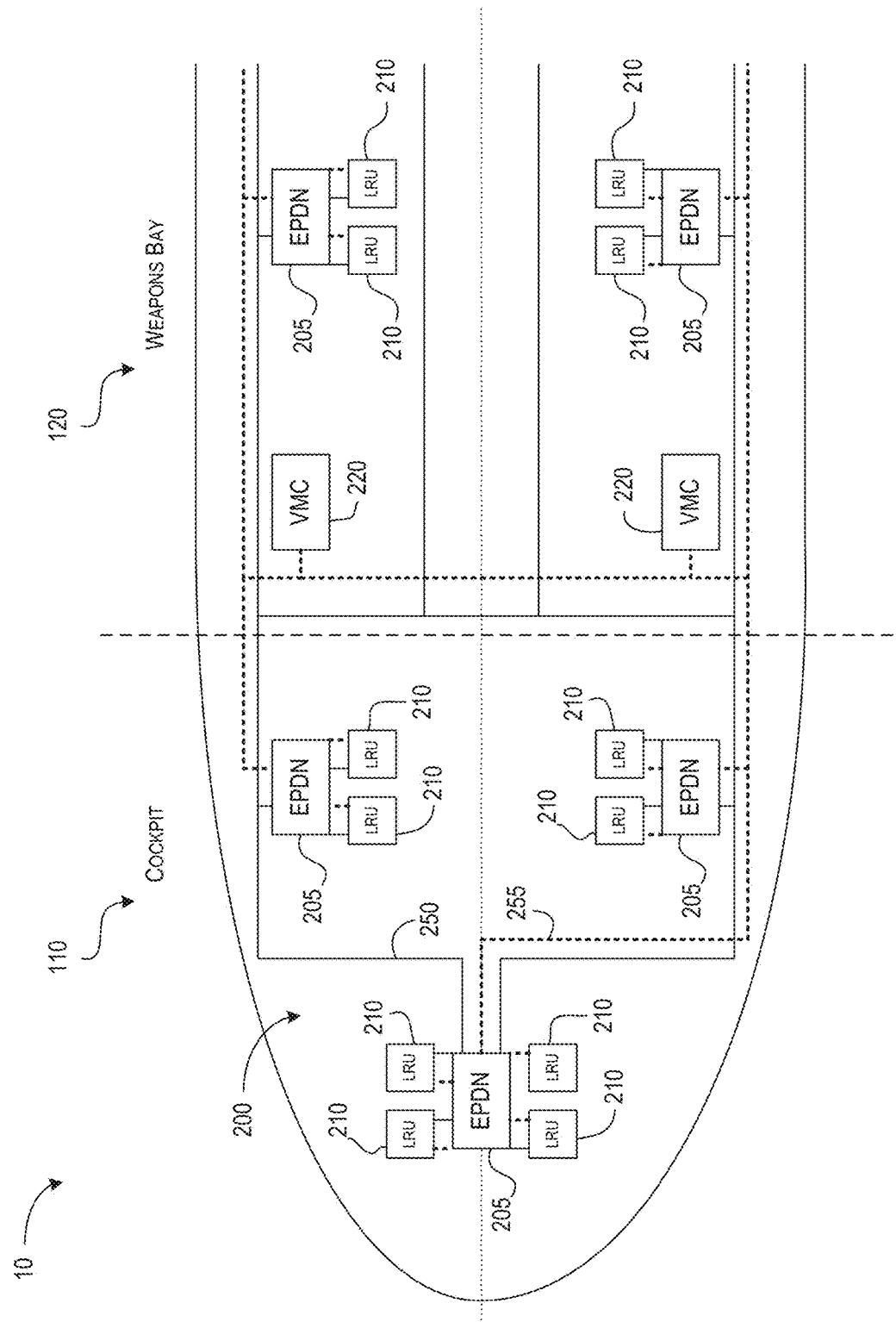
FIGS. 2A-2B depict a power and data distribution system of the rotary wing aircraft of FIG. 1 according to an exemplary embodiment.
Figure 2B:
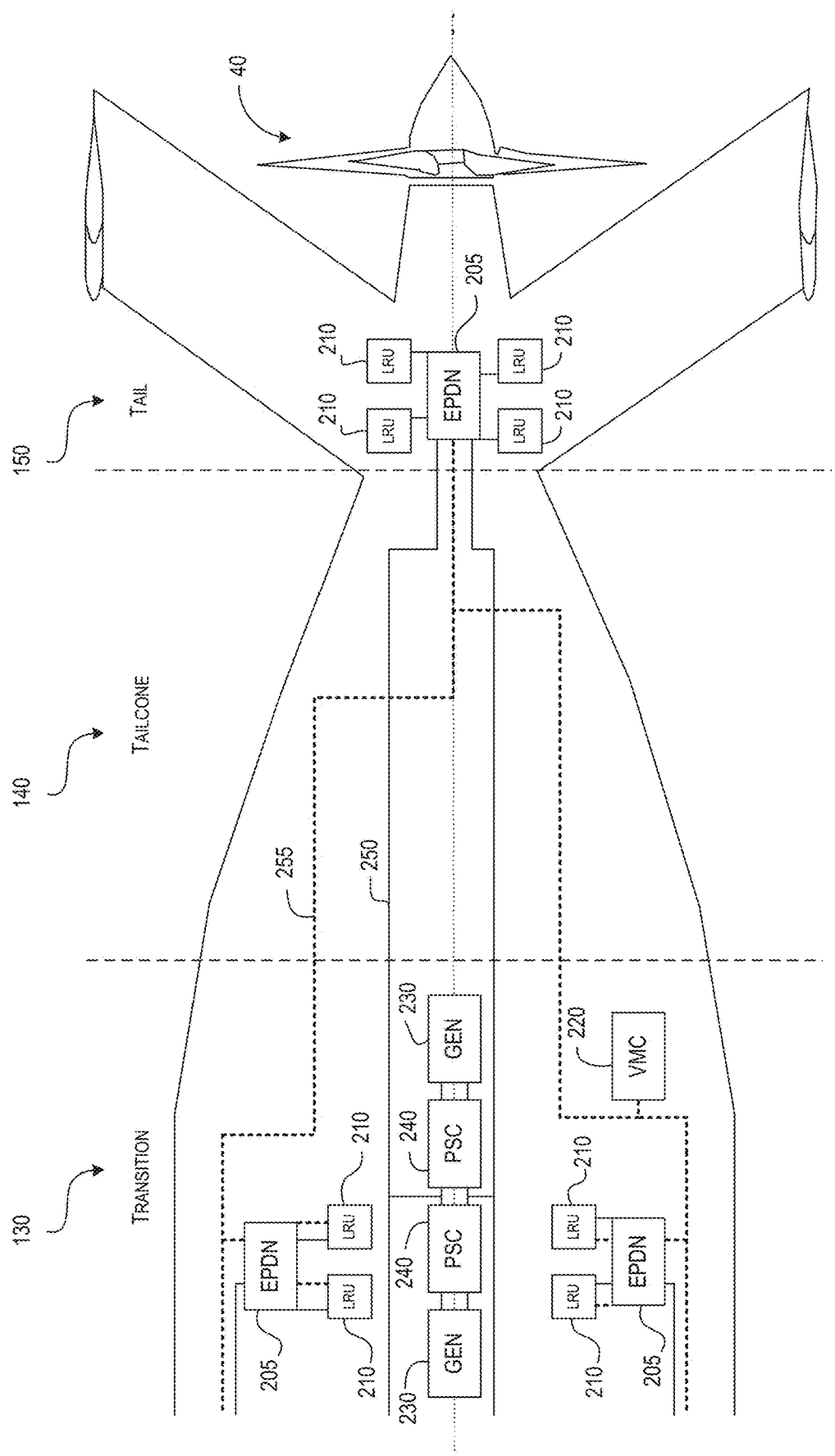

The aircraft 10 may include a plurality of electrical components, such as line replacement units (LRUs) placed at high concentration areas of data signal collection. As power also needs to be routed to the LRUs, the aircraft 10 may include a plurality of nodes (e.g., nodal points) within each zone or section of the aircraft. FIGS. 2A-2B illustrate an example power and data distribution system 200 for the aircraft 10. The aircraft 10 includes a plurality of zones, such as a first zone 110 (e.g., a cockpit), a second zone 120 (e.g., a weapons bay), a third zone 130 (e.g., a transition zone), a fourth zone 140 (e.g., a tailcone), and a fifth zone 150 (e.g., a tail). However, these zones are merely examples, and the aircraft 10 may include fewer or greater zones encompassing various regions of the aircraft 10. Edge power distribution nodes (e.g., EPDNs) 205 are situated throughout the various zones of the aircraft 10.

Each EPDN 205 is coupled to one or more line replacement units (LRUs) 210. The LRUs 210 may be, for example, replaceable electronic components such as radios, antennas, fuel gauges, sensors, and the like. The type of electronic component of the LRUs 210 may henceforth be referred to as an LRU type. The EPDNs 205 and LRUs 210 are described in further detail below.

The EPDNs 205 and the respective LRUs 210 are connected via power lines 250 (indicated by a solid line) and data lines 255 (indicated by a dotted line). The data lines 255 connect each EPDN 205 to one or more vehicle computers (VMC) 220 (e.g., an aircraft controller). While FIGS. 2A-2B illustrate VMCs 220 in the second zone 120 and the third zone 130, the VMCs 220 may instead or additionally be located elsewhere within the aircraft. Each EPDN 205 is coupled to a VMC 220 by one of the data lines 255 such that communication with the EPDN 205 and the VMC 220 is independent. In this manner, each VMC 220 sends signals only to the desired EPDN 205. Each EPDN 205 may be coupled to several VMCs 220. The VMCs 220 transmit and receive signals from the LRUs 210 coupled to each EPDN 205. Accordingly, each EPDN 205 acts as an intermediary for communication between a VMC 220 and an LRU 210. Communication may include, for example, control signals, status updates, status requests, and the like.

The power lines 250 connect each EPDN 205 to one or more power system controllers (PSCs) 240. The PSCs 240 control power distribution of one or more generators 230.

Upon receiving power from the power system controllers 240, an EPDN 205 controls power distribution to its respective connected LRUs 210. In some embodiments, the PSCs 240 control whether or not an EPDN 205 receives power. Each EPDN 205 may be coupled to the PSCs 240 by one of the power lines 250 such that power to each EPDN 205 is independent. In other embodiments, each EPDN 205 may be coupled to a power bus.

In some embodiments, the functions of the PSCs 240 and the VMCs 220 may be performed by a single processing unit. In other embodiments, the PSCs 240 and the VMCs 220 may work in conjunction to control both data communication and power distribution to respective LRUs. For example, should a specific LRU 210 need to be operated, the connected PSC 240 provides power to the respective EPDN 205 associated with the LRU 210. The VMC 220 then provides control signals to the respective EPDN 205 to be provided to the LRU 210. The VMC 220 may also provide commands for the EPDN 205 regarding power distribution to the LRU 210. Communication between the LRUs 210, EPDN 205, VMC 220, and PSC 240 is described in more detail below.

The power lines 250 and the data lines 255 may each be composed of individual cables coupling each EPDN to either the VMCs 220 or the PSCs 240. In some embodiments, multiple cables are connected together (e.g., "daisy-chained") to form the plurality of power lines 250 or the plurality of data lines 255.

Figure 3:
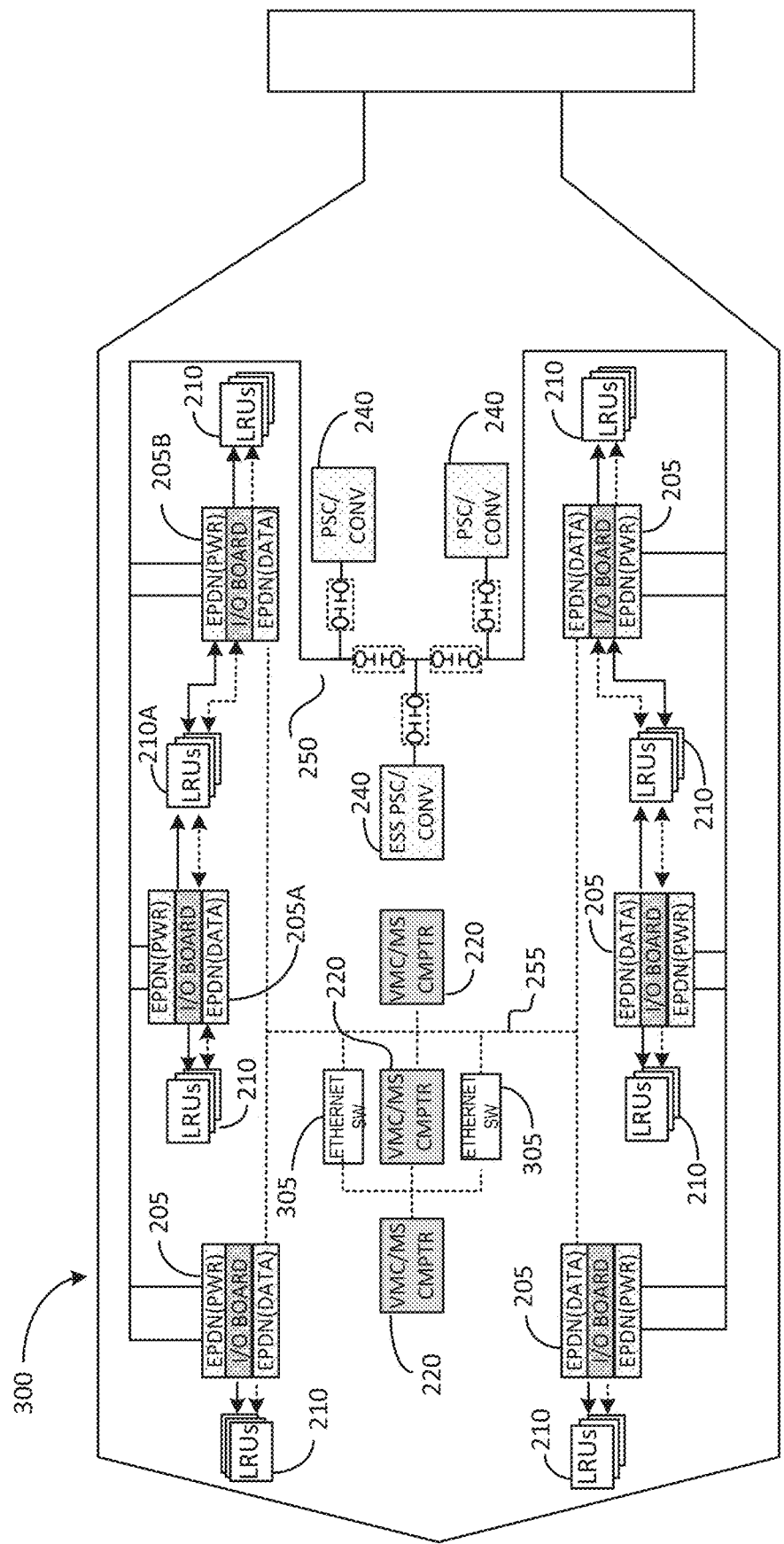
FIG. 3 depicts another power and data distribution system of the rotary wing aircraft of FIG. 1 according to another exemplary embodiment.

FIG. 3 illustrates another exemplary electrical system 300 for the aircraft 10. Similar to the power and data distribution system 200, the electrical system 300 includes a plurality of EPDNs 205 coupled to respective LRUs 210. As illustrated in the electrical system 300, multiple EPDNs 205 may be coupled to a single LRU 210 or a subset of the plurality of LRUs 210. For example, a first EPDN 205A and a second EPDN 205B are both coupled to a set of LRUs 210A. In some embodiments, the second EPDN 205B acts as a back-up should the first EPDN 205A experience a failure. Accordingly, the set of LRUs 210A may be high-priority LRUs 210 needing multiple sets of reinforcement from failure.

Additionally, the electrical system 300 includes ethernet switches 305 between the VMC 220 and the plurality of EPDNs 205. Each port of the ethernet switches 305 is associated with one of the respective EPDNs 205. To send a signal to the desired EPDN 205, the VMC 220 outputs the signal to the associated port of the ethernet switches 305.

Figure 4:
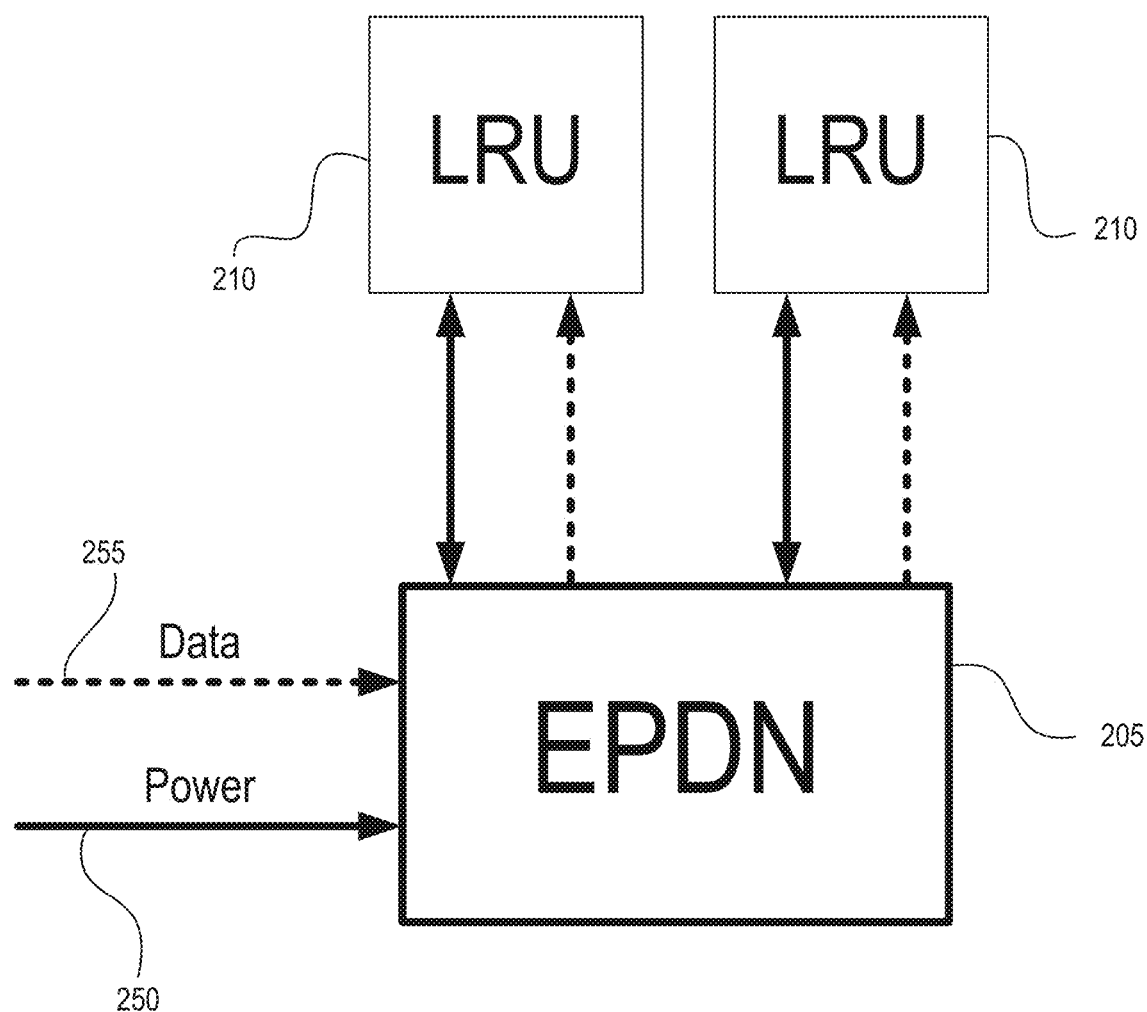
FIG. 4 depicts an edge power data node coupled to several line replacement units according to an exemplary embodiment.

FIG. 4 provides a block diagram of an example EPDN 205 coupled to a plurality of LRUs 210. A data line 255 provides power to the EPDN 205. A power line 250 provides power to the EPDN 205. The EPDN 205 distributes received data communications and power to coupled LRUs 210. While only two LRUs are illustrated, fewer or greater LRUs 210 may also be coupled to the EPDN 205.

Figure 5A:
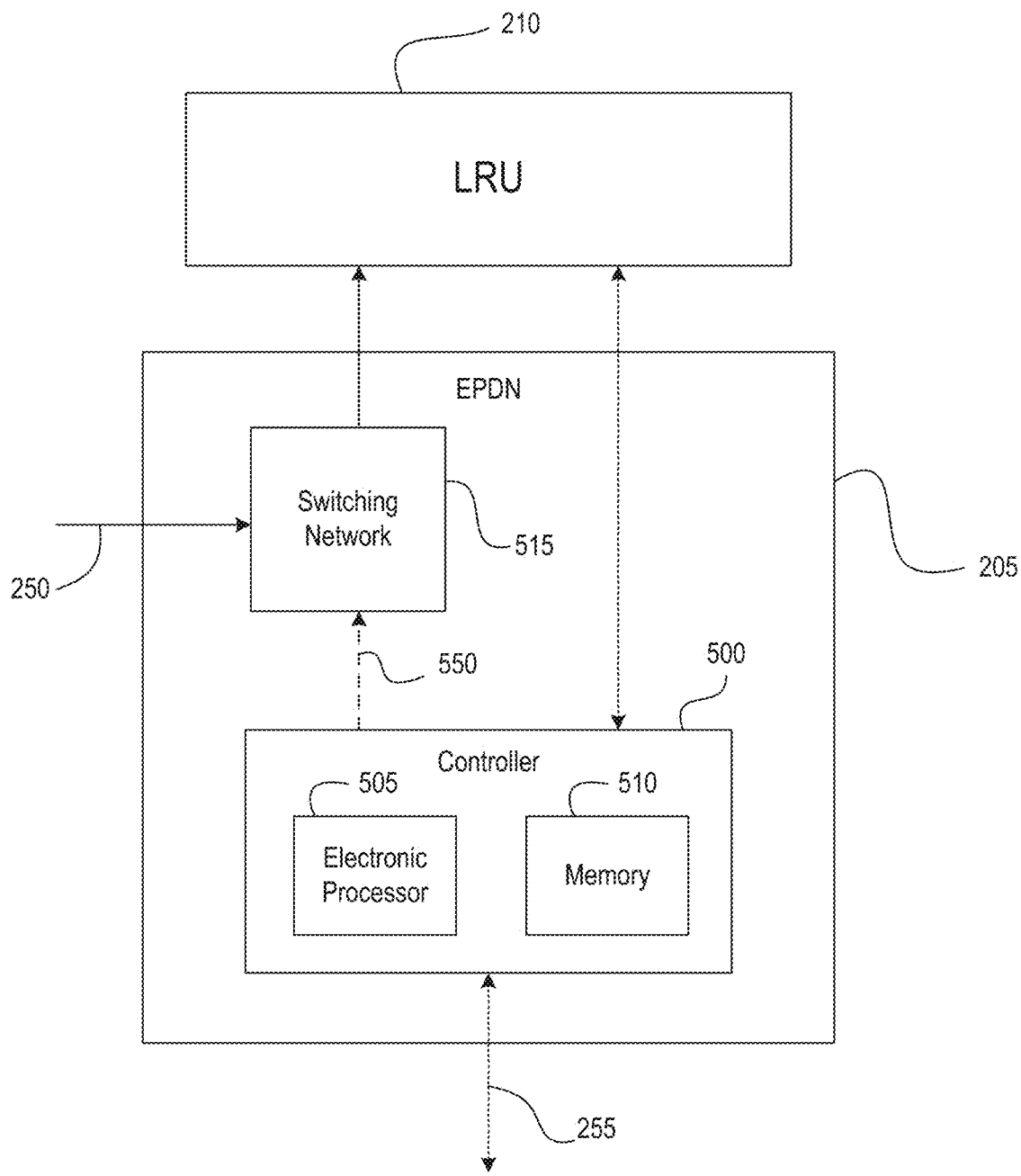
FIG. 5A depicts a block diagram of the edge power data node of FIG. 4 according to an exemplary embodiment.

FIG. 5A provides a block diagram of the EPDN 205. The EPDN 205 includes a controller 500 and a switching network 515 (e.g., a power switching network) integrated within an EPDN housing (now shown). The controller 500 includes an electronic processor 505 (for example, a programmable microprocessor, a microcontroller, a programmable logic controller, or some other suitable device) and a memory 510. The controller 500 may receive power from the power line 250, or may have some alternative power supply located within the housing of the EPDN 205.

The memory 510 is a non-transitory computer readable medium that includes, for example, a program storage area and a data storage area. The program storage area and the data storage area can include combinations of different types of memory, for example read-only memory ("ROM"), random access memory ("RAM") (for example, dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. In one example, the electronic processor 505 is connected to the memory 510 and executes software instructions that are capable of being stored in a RAM of the memory 510 (for example, during execution), a ROM of the memory 510 (for example, on a generally permanent basis), or another non-transitory computer-readable medium. The electronic processor 505 is configured to retrieve from the memory 510 and execute, among other things, instructions related to the processes and methods described herein. In other embodiments, the EPDN 205 includes additional, fewer, or different components.

The controller 500 controls power input to the LRU 210 using the switching network 515 (via command signals 550). The switching network 515 may include a plurality of circuit breakers used to control whether or not the LRU 210 is receiving power. For example, in some embodiments, the LRU 210 is configured to always receive power from the power line 250 through a circuit breaker included in the switching network 515. Should the power line 250 experience some sort of power failure or fault (e.g., an overcurrent condition, an overvoltage condition, or the like), the circuit breaker flips to stop providing power to the LRU 210. In some embodiments, the circuit breaker is a controllable circuit breaker with a switch controlled by the controller 500. Should the controller 500 detect a fault in the power line 250, the controller 500 controls the switch to stop power to the LRU 210. In some embodiments, the switching network 515 includes a plurality of switches, such as MOSFETs. The controller 500 controls the MOSFETs to deliver power to the LRU 210.

Figure 5B:
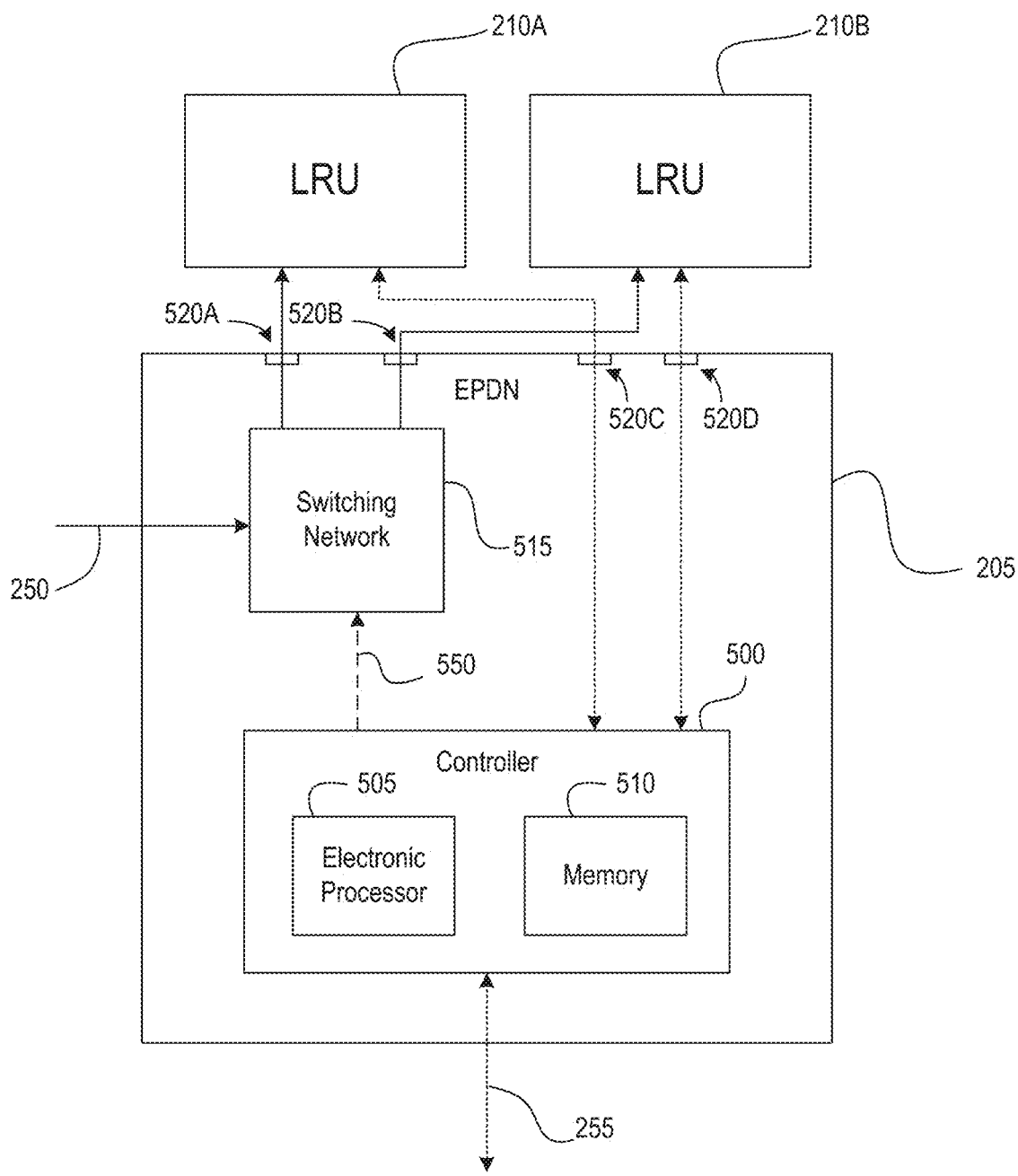
FIG. 5B depicts a block diagram of the edge power data node of FIG. 4 according to another exemplary embodiment.

As previously shown, multiple LRUs 210 may be connected to a single EPDN 205. FIG. 5B provides an example of an EPDN 205 coupled to a first LRU 210A and a second LRU 210B. The EPDN 205 may include a plurality of ports, such as first power port 520A, second power port 520B, first data port 520C, and second data port 520D. The first LRU 210A is coupled to the switching network 515 via a first power port 520A, and the second LRU 210B is coupled to the switching network 515 via a second power port 520B. The switching network 515 may include a circuit breaker between the power line 250 and the first power port 520A, and the power line 250 and the second power port 520B. Both the first LRU 210A and the second LRU 210B may be configured to constantly receive power from the power line 250. Should a fault occur, each LRU 210A, 210B is protected via its respective circuit breaker. In some embodiments, each circuit breaker is a controllable circuit breaker with a switch controlled by the controller 500. Should the controller 500 detect a fault in the power line 250, the controller 500 controls the switch to stop power to the first LRU 210A and the second LRU 210B. In some embodiments, the switching network 515 includes a plurality of switches controlled by the controller 500 to deliver power to the first LRU 210A and the second LRU 210B. Accordingly, power delivery to the first LRU 210A and the second LRU 210B may be independently controlled.

The controller 500 also controls data distribution for the connected LRUs 210. When a single LRU 210 is connected to the EPDN 205, as shown in FIG. 5A, the controller 500 acts as an intermediary between the LRU 210 and a VMC 220. Accordingly, any commands from the VMC 220 are provided to the controller 500. The controller 500 then passes the command to the LRU 210. Additionally, any data from the LRU 210 is provided to the controller 500, which passes the data to the VMC 220.

When multiple LRUs 210 are coupled to the EPDN 205, such as first LRU 210A and second LRU 210B, the controller 500 handles data distribution to each LRU 210. For example, a VMC 220 provides a command to the controller 500. The command may include an address indicating whether the command is for the first LRU 210A or the second LRU 210B. The address may indicate, for example, whether the command is for the first data port 520C or the second data port 520D. The controller 500 then provides the data to the data port associated with the LRU 210A, 210B indicated by the address. When data is received from either the first LRU 210A or the second LRU 210B, the controller 500 provides the data to the VMC 220 via the data line 255. In some embodiments, the first LRU 210A and the second LRU 210B provide data with an address indicating the address of the respective LRU 210, such that the VMC 220 may determine which LRU 210 provided the data. In other embodiments, the controller 500 attaches an address to the data prior to transmitting the data to the VMC 220.

In some embodiments, LRUs 210 may be replaced, either with an LRU 210 of the same type or an LRU 210 of a different type (e.g., replacing a fuel gauge with a new fuel gauge or replacing a fuel gauge with a radio). When an LRU 210 is replaced, the EPDN 205 may be reconfigured to account for the requirements of the new device. For example, the new LRU 210 may have a different power requirement than the replaced (or previous) LRU 210. Accordingly, in some embodiments, the switching network 515 is updated to account for new power requirements. Updating the switching network 515 may include reconfiguring (e.g., replacing) the circuit breakers to account for the standard power draw of the new LRU 210. By updating the switching network 515 to account for new power requirements, the wiring of the power line 250 and configuration of the PSC 240 stay the same. Accordingly, any updates for power occur only at the EPDN 205, simplifying the LRU replacement process.

When an LRU 210 is replaced, software at the VMC 220 may be updated to account for the programs performed by the new LRU 210. For example, if a fuel gauge is replaced with a radio or an updated fuel gauge, the VMC 220 is also updated with new software for operating the LRU 210 and reading data from the LRU 210. The software of the VMC 220 may be updated by an operator of the aircraft 10, or may be updated based on updated software provided by the new LRU 210.

In some embodiments, the EPDN 205 may have an offline mode (e.g., a sleep mode) in which power and data distribution to connected LRUs 210 is disabled. When the EPDN 205 is in the offline mode, the controller 500 may transmit an offline status indicator to the VMC 220. When the VMC 220 has data to send to one of the LRUs 210, the VMC 220 may first transmit a wake signal to the controller 500 to remove the EPDN 205 from the offline mode such that power and data distribution to the LRUs 210 is activated. In some embodiments, power distribution to the LRUs 210 is maintained when the EPDN 205 is in the offline mode. In such embodiments, when an LRU 210 has data to transmit to the VMC 220, the LRU 210 first transmits a wake signal to the controller 500 such that data distribution is activated.

In some embodiments, the controller 500 determines when a connected LRU 210 needs to be replaced. The controller 500 may determine the LRU 210 needs to be replaced based on a signal from the LRU 210 indicating an error, detecting an operating error of the LRU 210, detecting an operating time of the LRU 210 exceeding a recommended lifetime threshold, or the like. As one example, an LRU 210 connected to the controller 500 is sent a power ON command from the controller 500. However, the controller 500 fails to receive any data from the LRU 210. The controller 500 detects an error of the LRU 210 and sends a "loss communication" status message (e.g., fault message) to the VMC 220. In some embodiments, the VMC 220 determines an LRU 210 needs to be replaced based on signals received from the LRU 210 (via the controller 500).

In some embodiments, an EPDN 205 may also need to be replaced. When an EPDN 205 is replaced, the power line 250, the data line 255, and any coupled LRUs 210 are connected to the respective ports of a new EPDN 205. Accordingly, no new wiring is needed.

Figure 6:
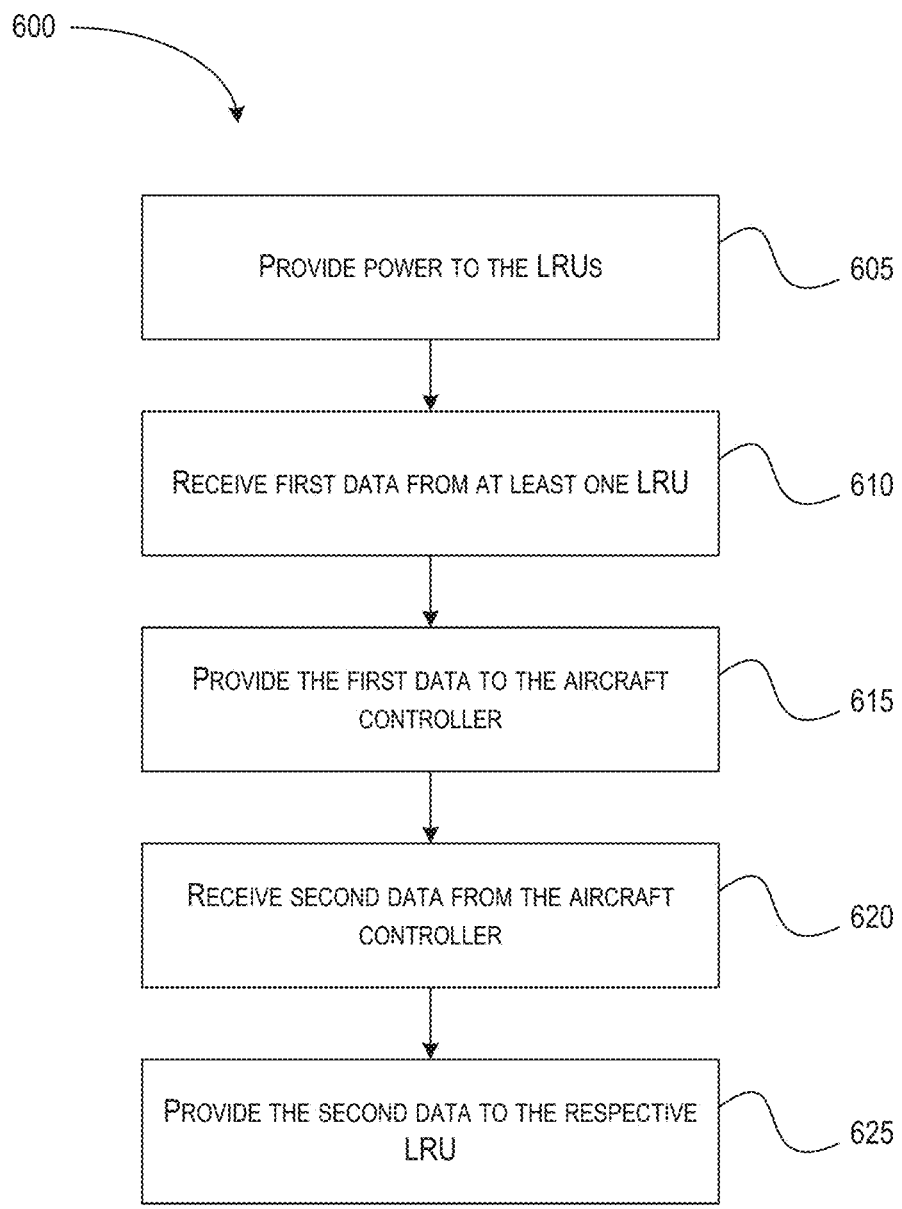
FIG. 6 depicts a method performed by the edge power data node of FIG. 4 according to an exemplary embodiment.

FIG. 6 provides a method 600 performed by the controller 500 for operation of the EPDN 205. At block 605, the controller 500 controls power to the LRUs 210 connected to the EPDN 205. For example, the controller 500 controls the switching network 515 to provide power to the LRUs 210. In some embodiments, the LRUs 210 automatically receive power from the power line 250 through the switching network 515. At block 610, the controller 500 receives first data from at least one LRU. For example, referring to FIG. 5B, the controller 500 receives data from the first LRU 210A, the second LRU 210B, or both the first LRU 210A and the second LRU 210B. At block 615, the controller 500 provides the first data to the VMC 220 via the data line 255. At block 620, the controller 500 receives second data from the VMC 220 via the data line 255. At block 625, the controller 500 provides the second data to the respective LRU (e.g., either the first data port 520C or the second data port 520D).

Figure 7:
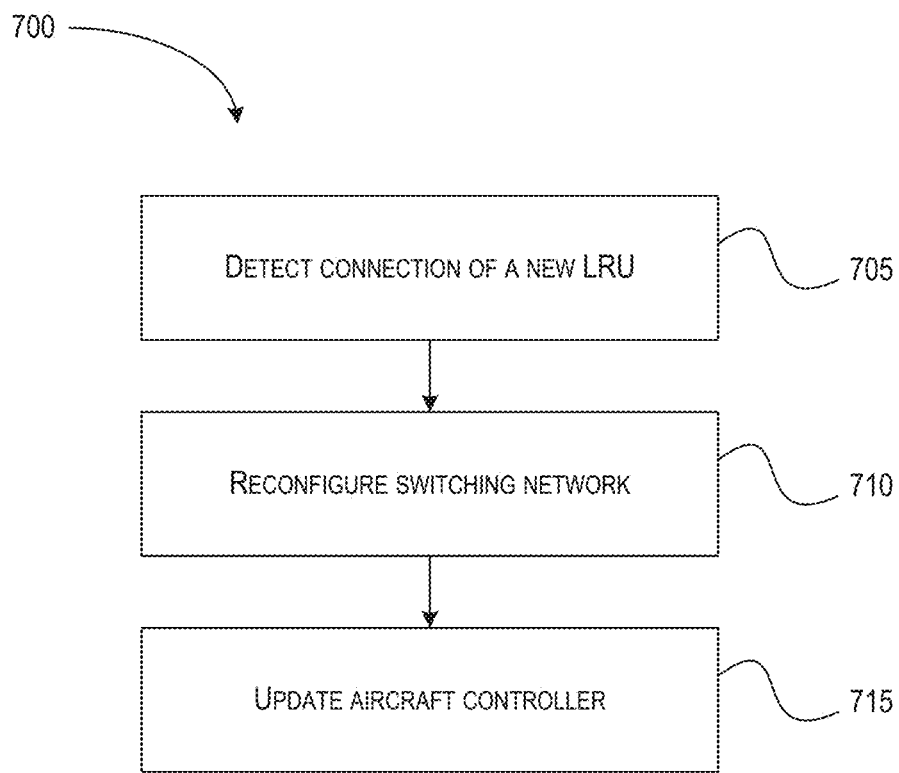
FIG. 7 depicts a method for connecting a new line replacement unit to the edge power data node of FIG. 4 according to an exemplary embodiment.

FIG. 7 provides a method 700 for connecting a new LRU 210 to the EPDN 205. The method 700 may be performed by the controller 500, the VMC 220, an operator of the aircraft 10, or a combination thereof. For example, referring to FIG. 5B, only the first LRU 210A is connected to the EPDN 205 prior to performance of method 700. At block 705, the controller 500 detects connection of a new LRU 210, such as the second LRU 210B. At block 710, the switching network 515 is reconfigured to account for power requirements of the new LRU 210. Reconfiguring the switching network 515 may include, for example, replacing a circuit breaker, adding a new circuit breaker, or controlling one or more switches (e.g., MOSFETs) to provide power to the power port of the new LRU 210 (e.g., the second power port 520B). At block 715, the VMC 220 is updated. For example, an operator of the aircraft 10 may provide updated software to the VMC 220. In other embodiments, the new LRU 210 provides updated software to the VMC 220 via the controller 500. Once the switching network 515 is reconfigured and the VMC 220 is updated, the controller 500 may operate the new LRU 210 according to method 600. In some embodiments, the controller 500 software may be updated by the VMC 220 or the LRU 210. For example, the controller 500 may be updated if placed in a supervisory role, in which the controller 500 provides fault data and status updates regarding connected LRUs 210 to the VMC 220.

Figure 8:
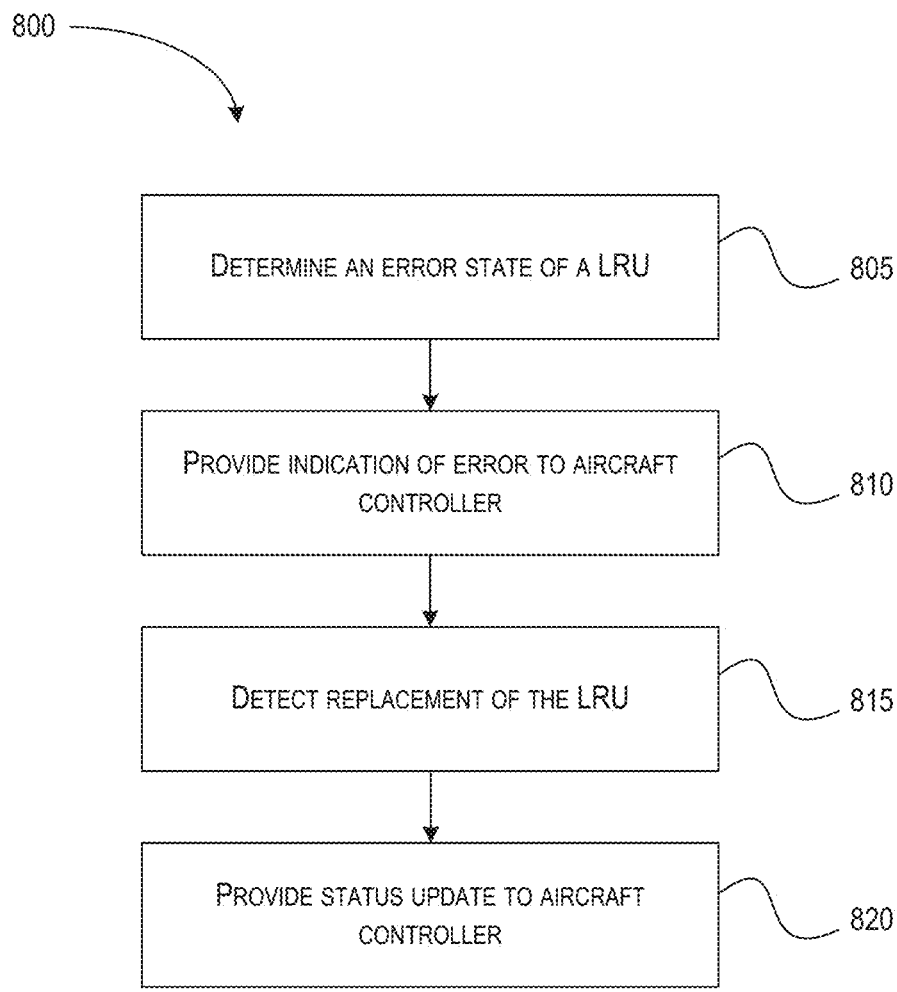
FIG. 8 depicts a method for replacing a line replacement unit connected to the edge power data node of FIG. 4 according to an exemplary embodiment.

FIG. 8 provides a method 800 for replacing an erroneous LRU 210. The method 800 may be performed by the controller 500. At block 805, the controller 500 determines an occurrence of an error state of a connected LRU 210. In some embodiments, the LRU 210 provides an error signal to the controller 500 indicative of the error state. In other embodiments, the controller 500 determines the occurrence of the error state based on operating conditions of the LRU 210. At block 810, the controller 500 provides a signal indicative of the error state of the LRU 210 to the VMC 220. In some embodiments, upon detection of the error state, the VMC 220 stops communication with the LRU 210.

At block 815, the controller 500 detects replacement of the erroneous LRU 210. For example, an LRU 210 with an identical LRU type is connected to the EPDN 205 at the same ports as the erroneous LRU 210. At block 820, the controller 500 provides a status update to the VMC 220. The status update is indicative of the new LRU 210 being connected to the EPDN 205. In some embodiments, upon receiving the status update, the VMC 220 begins communication with the new LRU 210 via the controller 500.

Figure 9:
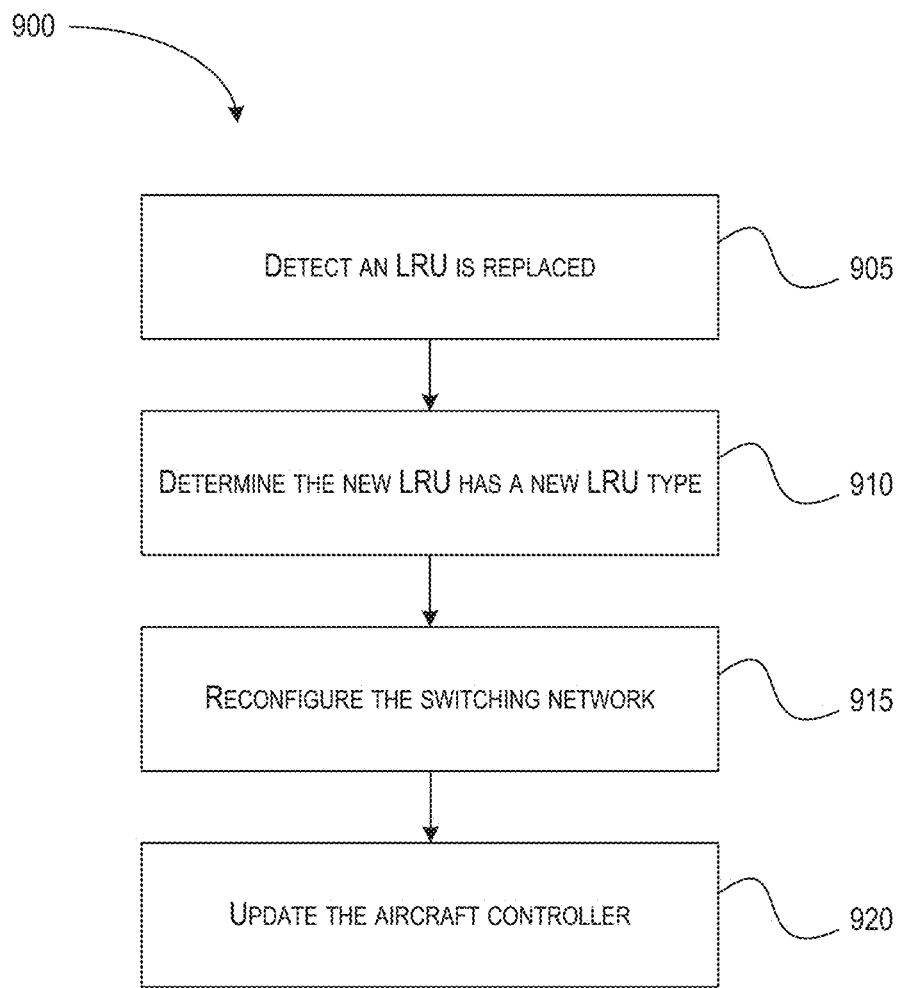
FIG. 9. depicts another method for replacing a line replacement unit connected to the edge power data node of FIG. 4 according to an exemplary embodiment.

FIG. 9 provides a method 900 for replacing an LRU 210 of a first type with an LRU 210 of a second type. The method 900 may be performed by the controller 500, the VMC 220, an operator of the aircraft 10, or a combination thereof. At block 905, the controller 500 detects that an LRU 210 has been replaced. For example, an LRU 210 having a first type has been replaced with an LRU 210 having a second type. At block 910, the controller 500 determines that the new LRU 210 has a new LRU type. At block 915, the controller 500 reconfigures the switching network 515, as previously described. At block 920, the controller 500 updates the VMC 220, as previously described.

Accordingly, embodiments described herein provide power and data distribution on an aircraft. Various features and advantages of the embodiments described herein are set forth in the following claims.

What is claimed is:

1. An aircraft comprising:
    a plurality of nodes, each node connected to a plurality of line replacement units (LRUs), wherein the plurality of LRUs are each replaceable electronic components, wherein the nodes are edge power data nodes which act as an interchange point for handling both data and power requirements for connected LRUs, wherein each node and LRUs connected to each node are connected via a power line and a data line, each node including a node controller;
    a power system controller configured to control power distribution to each of the plurality of nodes; and
    an aircraft controller configured to transmit data to each of the plurality of nodes and configured to receive data from each of the plurality of nodes,
    wherein the node controller includes an electronic processor and a memory, and wherein the node controller is configured to:
        control power provided by the power system controller to the plurality of LRUs;
        receive first data from at least one LRU of the plurality of LRUs;
        provide the first data to the aircraft controller;
        receive second data from the aircraft controller, wherein the second data includes an address for a first LRU of the plurality of LRUs; and
        provide the second data to the first LRU of the plurality of LRUs based on the address.

2. The aircraft of claim 1, wherein each node of the plurality of nodes further includes a power switching network, and wherein the node controller is further configured to:
    control the power switching network to provide power to the plurality of LRUs.

3. The aircraft of claim 2, wherein the power switching network includes a plurality of circuit breakers coupled to the plurality of LRUs.

4. The aircraft of claim 2, wherein the node controller and the power switching network are integrated into a housing.

5. The aircraft of claim 1, wherein the node controller is further configured to:
    determine an error state of at least one of the plurality of LRUs; and
    provide a signal indicative of the error state of the at least one of the plurality of LRUs to the aircraft controller.

6. The aircraft of claim 1, wherein the aircraft controller is configured to independently communicate with each node of the plurality of nodes via an ethernet switch.

7. The aircraft of claim 1, wherein the power system controller is electrically coupled to one or more generators configured to generate the power provided to each of the plurality of nodes.

8. The aircraft of claim 1, wherein the aircraft is a rotary wing aircraft, and wherein the aircraft further includes:
    a main rotor assembly including an upper rotor assembly driven in a first direction about a main rotor axis and a lower rotor assembly driven in a second direction about the main rotor axis.

9. The aircraft of claim 1, wherein the plurality of nodes are distributed amongst a cockpit, a weapons bay, and a tail of the aircraft, and wherein the plurality of nodes are connected via a plurality of power lines and a plurality of data lines.

10. A method of updating an aircraft system, the method comprising:
    monitoring, with an edge power distribution node (EPDN), a first line replacement unit (LRU) being a replaceable electronic component,
    transferring, with the EPDN, first data received from the first LRU to a vehicle computer,
    detecting, at the EPDN, a connection of a second LRU to the EPDN, wherein the second LRU is a LRU not previously connected to the EPDN,
    transmitting, with the EPDN, a status update to the vehicle computer indicative of the connection of the second LRU,
    transferring, with the EPDN, second data received from the second LRU to the vehicle computer.

11. The method of claim 10, further comprising:
    providing, with a switching network, power to the first LRU and the second LRU.

12. The method of claim 11, wherein the switching network includes at least one circuit breaker, and wherein the method further comprises:
    reconfiguring the at least one circuit breaker according to a power requirement of the second LRU.

13. The method of claim 10, further comprising:
    updating a software of the vehicle computer based on the connection of the second LRU to the EPDN.

14. The method of claim 10, further comprising:
    determining, with the EPDN, an error state of at least one of the plurality of LRUs; and
    providing, with the EPDN, a signal indicative of the error state of the at least one of the plurality of LRUs to the aircraft controller.

15. A control system for an aircraft, the control system comprising:
    a node, the node connected to a first line replacement unit (LRU), wherein the first line replacement unit is a replaceable electronic component, wherein the node is an edge power data node which acts as an interchange point for handling both data and power requirements for connected LRUs, wherein the first LRU is connected to the node via a power line and a data line, the node including a node controller; and an aircraft controller configured to transmit data to the node and configured to receive data from the node, wherein the node controller includes an electronic processor and a memory, and wherein the node controller is configured to:
control, with a switching network, power to the first LRU,
provide command signals from the aircraft controller to the first LRU,
provide data from the first LRU to the aircraft controller,
detect a connection of a second LRU, wherein the second LRU is a LRU not previously connected to the EPDN, and
provide, upon detection of the connection of the second LRU, a status update to the aircraft controller indicative of the connection of the second LRU.

16. The control system of claim 15, wherein the node controller is further configured to:
determine an error state of the first LRU, and
provide a signal indicative of the error state of the first LRU to the aircraft controller.

17. The control system of claim 15, wherein the node controller is further configured to:
detect that the first LRU has been replaced with an updated LRU, and
provide a status update to the aircraft controller indicative of the replacement.

18. The control system of claim 15, wherein the node controller is further configured to:
receive a software update from the second LRU, and
provide the software update to the aircraft controller.

19. The control system of claim 15, further comprising:
a power system controller configured to control power distribution to the node,
wherein the power system controller is electrically coupled to one or more generators configured to generate the power provided to the node.

20. The control system of claim 15, further comprising:
a second node connected to the second LRU,
wherein the aircraft controller is configured to communicate with the first node independently from the second node via an ethernet switch.

* * * * *